United States Patent [19]
Jenvey et al.

[11] 3,750,835
[45] Aug. 7, 1973

[54] STEERING ARRANGEMENTS FOR MOTOR VEHICLES

[75] Inventors: Leslie Richard Jenvey, Reading; Barry John Millard, Earley, near Reading, both of England

[73] Assignee: Adwest Engineering Limited, Berkshire, England

[22] Filed: Oct. 26, 1971

[21] Appl. No.: 192,503

[30] Foreign Application Priority Data
Oct. 28, 1970   Great Britain................... 51,322/70

[52] U.S. Cl................. 180/79.2 R, 60/401, 60/476
[51] Int. Cl.............................................. B62d 5/06
[58] Field of Search........................... 180/79.2 R; 280/87 B; 60/52 S, 401, 476

[56] References Cited
UNITED STATES PATENTS

| 1,442,540 | 1/1923 | Ross | 180/79.2 R |
| 1,687,720 | 10/1928 | Garner | 280/87 B |
| 3,669,146 | 6/1972 | Adams | 180/79.2 R |
| 1,429,101 | 9/1922 | Ross | 180/79.2 R |
| 2,008,344 | 7/1935 | Wilhelm | 280/87 B |
| 2,192,175 | 3/1940 | Ballard | 180/79.2 R |

FOREIGN PATENTS OR APPLICATIONS

| 1,130,779 | 10/1956 | France | 60/52 S |
| 1,100,689 | 1/1968 | Great Britain | 280/87 B |

*Primary Examiner*—Leo Friaglia
*Assistant Examiner*—John A. Pekan
*Attorney*—Larson, Taylor & Hinds

[57] ABSTRACT

In a motor vehicle having steerable road wheels, a steering arrangement comprising a steering wheel or like control, a first positive displacement pump motor operatively connected to the steering control for actuation thereby, a second positive displacement pump motor operatively connected to said steerable road wheels for imparting steering thereto, and means connecting the output of each positive displacement pump motor with the input of the other and forming with the positive displacement pump motors a closed hydrostatic circuit.

5 Claims, 3 Drawing Figures

PATENTED AUG 7 1973

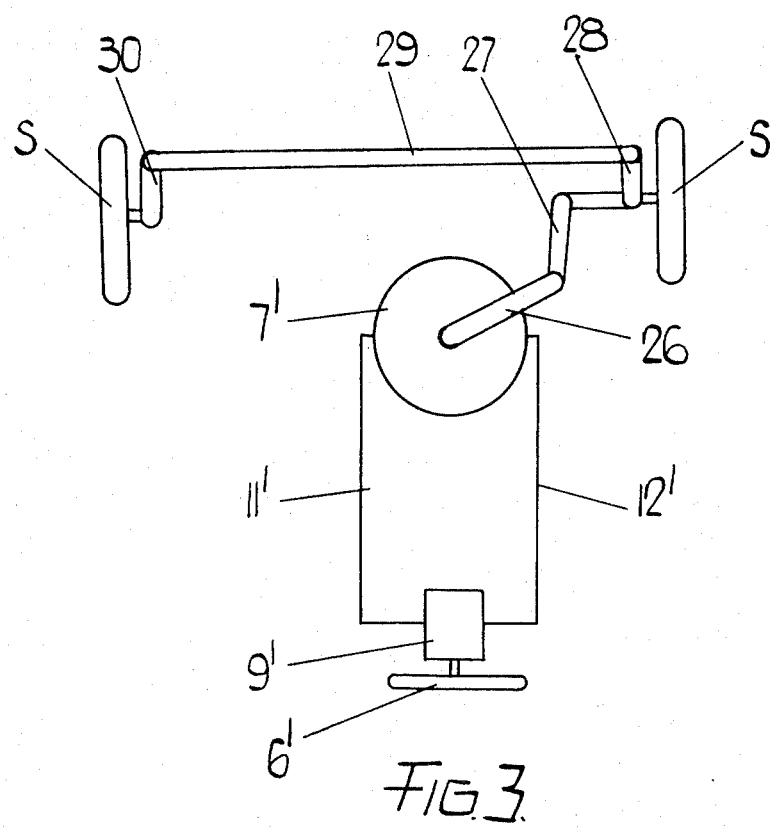

STEERING ARRANGEMENTS FOR MOTOR VEHICLES

This invention relates to steering arrangements for motor vehicles.

Steering arrangements for motor vehicles conventionally comprise mechanical linkages between the steerable road wheels and a steering wheel or the like. The arrangement may additionally include hydraulic or other means for providing power assistance. In any event, the mechanical linkages conventionally include a rack and pinion or other motion transmitting means for converting the angular motion of the steering column into a motion applied to the steerable wheels.

The general aim of the present invention is to provide a steering arrangement for a motor vehicle in which at least part of the mechanical linkage is replaced by a nonmechanical linkage.

In the mechanism according to the present invention a hydrostatic linkage is provided between the steering wheel or like control and the steerable wheels the linkage including two positive displacement pump motors, the steering control being mechanically connected to one pump motor and the other pump motor being mechanically connected to means for turning the steerable road wheels, the two pump motors being connected together by conduits connecting the output of one pump motor with the input of the other pump motor and forming a closed hydrostatic circuit containing hydraulic fluid.

By the term 'positive displacement pump motor' is meant a pump cum hydraulic motor in which either the rotor can be mechanically turned to drive fluid, or the rotor can be driven by fluid and the motion of the rotor can be transmitted mechanically, the angular motion of the rotor corresponding to a positive displacement, i.e., an accurate volume of fluid.

Thus, the idea of the invention is that the pump motor connected to the steering wheel or the like, ("the control pump motor"), will be turned directly by the steering wheel or the like and will drive hydraulic fluid along the conduit from the output of this pump motor to the input of the other ("slave") pump motor. Because there is a complete closed circuit an equivalent quantity of hydraulic fluid will pass from the output of the slave pump motor to the input of the control pump motor connected to the steering wheel or the like. Thus the volume of hydraulic fluid driven by the control pump motor and supplied to the slave pump motor is directly proportional to the angular turning motion of the steering wheel or the like.

The principal advantage of the hydrostatic linkage of the present invention compared with the conventional totally mechanical linkage is the flexibility of siting of the steering wheel or the like in relation to the steerable road wheels and ease of installation, since the closed hydraulic circuit connecting these pump motors can be in any suitable spacial relationship. This assist the fitting or packaging of the steering mechanism within a motor vehicle.

The two pump motors may be of identical capacity, that is to say fluid displacement per revolution, such that turning of the control pump motor will produce an identical turning of the slave pump motor. Alternatively the two pump motors may have differing capacities thereby providing a transmission ratio in the hydrostatic transmission between the two pump motors and hence between the steering wheel and the steerable wheels. The ratio may, for example, be a ratio of 3:1. That is to say, the capacity of the pump motor associated with the steerable wheels is three times the capacity of the pump motor associated with the steering wheel or the like. In any event, the capacity of the pump is small and for example of the order of 1.2 cubic inches per revolution to 4.6 cubic inches per revolution.

The closed hydraulic circuit is advantageously connected to a small reservoir of fluid via a non return valve. Suitable air release points will be provided in the hydraulic circuit to remove air from the system in the same fashion as for example in a hydraulic vehicle braking system. The hydraulic fluid may have a relatively high viscosity, particularly since temperature is not a problem, and the high viscosity fluid will make the hydraulic linkage more efficient by reducing slip.

The hydrostatic linkage provided in accordance with the invention may be used in association with any conventional mechanical steering means. That is to say the hydrostatic linkage may merely replace the lower end of the steering column, a shortened steering column connecting the steering wheel or the like with the control pump motor and the slave pump motor being arranged transmit motions to the steerable wheels through any suitable means, e.g., being arranged to drive a conventional steering box connected to the steerable road wheels or by a rack and pinion or other known means.

However, in accordance with a further aspect of the present invention the hydrostatic linkage may totally replace mechanical linkages, that is, may obviate the necessity for a conventional steering box and rack and pinion or similar means. In accordance with this concept there is a relatively large ratio, for example 25:1, between the capacities of the control and slave pump motors respectively associated with the steering wheel or the like and the steerable road wheels. In this case the large slave pump motor would constitute an actual steering unit with a lever fitted to the shaft of the pump motor and adapted to turn for less then a revolution and connected directly to the steering arms of the road wheels. The two steering arms associated with the two steerable road wheels may be linked together by a mechanical or other linkage and turned from a common slave pump motor. Alternatively, two slave pump motors could be respectively associated with the control pump motor.

An advantage of the invention is that the control pump motor may be duplicated, that is to say a number of control pump motors can be provided at a plurality of suitable locations whereby the vehicle can be selectively controlled from any one of these control pump motors and the siting of the control pump motors is made very flexible by reason of the hydrostatic linkage. This has applications in control vehicles having dual internal control, e.g., for special purposes and for the training of drivers and for vehicles having internal and external control stations. Such a vehicle may have the usual internal control station and an external station mounted on a boom extending from the vehicle. The steering mechanism may include means for providing power assistance, for example of hydraulic form. Fluid for this purpose will be provided by an engine driven pump. The control valve for this power assistance means may be a rotary or like control valve of the form disclosed and claimed in either of United Kingdom Patents 818 483 or 958 558 and may be located in any convenient position which will provide the requisite positive control. Thus, in the case of an off-the-road vehicle, e.g., a vehicle for use in constructional purposes or a special purpose vehicle where ultra-positive steering control and 'feel' are not required the rotary or like control valve may be located adjacent the means for transmitting the motion of the slave pump to the steerable road wheels, for example the pinion of a rack and pinion steering unit. This arrangement has the advantage that the control pump motor may be duplicated so that the vehicle can be controlled from more than one location adjacent each control pump motor.

However, in order that the best performance may be obtained on a road vehicle, for example, a motor car, lorry or the like it is important that the rotary or like control valve, controlling the flow of fluid supplied from an engine driven pump is located close to the steering wheel or the like.

The reason behind this is that it is necessary for the valve to return to its neutral position when the steering wheel or the like is released instantly so stopping the power assistance means in the direction turned. If, however a device or torsion bar for returning the valve rotor to its neutral position, has first of all to reverse the pump motor system, the return would be slow and would necessitate the use of a heavy torsion bar or equivalent device which is undesirable in power assisted steering because of the effort required to wind up such a bar.

In order that the invention may be more clearly understood specific constructional examples thereof will now be described with reference to the accompanying drawings wherein:

FIG. 3 is a sketch of a hydrostatic arrangement avoiding the use of a rack and pinion or like transmission means.

Figure 1:
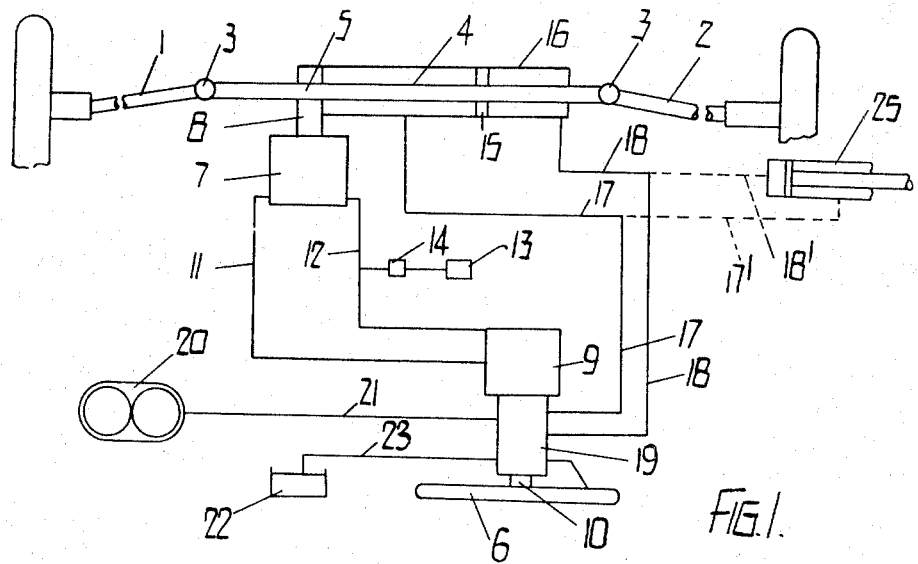
FIG. 1 is a diagram of a steering arrangement comprising a hydrostatic circuit and hydraulic power assistance means in which the control valve is located adjacent the means for transmitting motion to the steerable road wheels.
Figure 2:
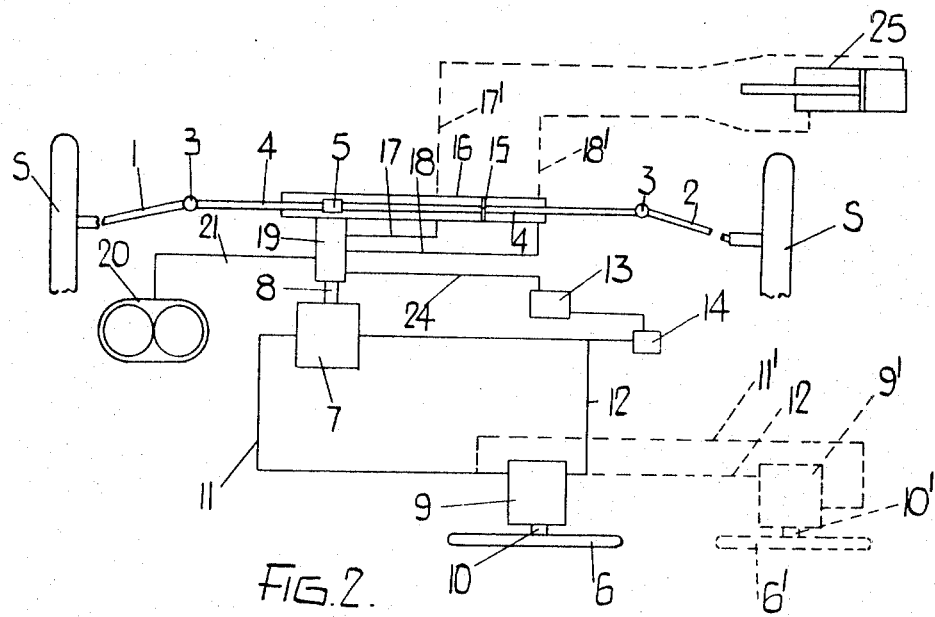
FIG. 2 is a similar diagram of a steering arrangement comprising a hydrostatic circuit and hydraulic power assistance means in which the control valve is located adjacent the steering wheel.

In both FIGS. 1 and 2 the arrangement comprises steering links 1 and 2 adapted to be connected respectively to two steerable road wheels (not shown). The links are connected via ball joints 3 to the opposite ends of a conventional steering transmission means, in this case to the rack 4 of a rack and pinion steering unit. The pinion 5 of this unit is adapted to move the rack in conventional fashion. The motion is transmitted to the pinion 5, not via the conventional a steering column but from a hydrostatic linkage in accordance with the invention from a steering wheel or like control means 6. A positive displacement slave pump motor 7 is associated with the pinion 5. Thus, the rotor of the pump motor is connected to one end of a shaft 8 which is rotatable in bearings (not shown) and at its other end carries the pinion 5. Similarly, the steering wheel 6 has associated therewith a positive displacement control pump motor 9.

Thus the rotor of the pump motor 9 is connected to one end of an attenuated steering column 10, which at its other end carries the steering wheel 6. The pump motor units 7 and 9 could be of identical capacity but, in this examle, the pump motor 7 has a capacity three times that of the pump motor 9 providing a gear ratio of 1 to 3 between the steering wheel and the pinion 5.

The pump motors 7 and 9 are connected together by two conduits 11 and 12, each of which connects the output of one pump motor with the input of the other pump motor to form an endless closed hydrostatic circuit containing hydraulic fluid of relatively high viscosity. The closed circuit 11, 12 is connected to a reservoir 13 of hydraulic fluid via a non-return valve 14. The reservoir may be pressured by air or an inert gas at low pressure e.g., 5–15 p.s.i. Thus, rotation of the steering wheel 6 in one direction will turn the rotor of the control pump motor 9 so that fluid will flow along one of the conduits 11 or 12 to the slave pump motor 7 and turn the rotor of the latter and hence the pinion 5 and rack 4 and steerable wheels. Turning of the steering wheel 6 in the opposite direction will produce flow in the opposite direction in the hydrostatic circuit along the conduit 12 or 11 and turn the rotor of the slave pump motor 7 in the opposite direction and hence the rack 5 and pinion 4 and steerable road wheels.

In the steering arrangement of both FIGS. 1 and 2, hydraulic means are provided for power assistance. These means comprise a piston 15 coupled to and movable with the rack 4. The piston 15 is slideable in a double acting cylinder 16. Conduits 17 and 18 are respectively connected to the opposite ends of the cylinder 16 and are adapted to supply hydraulic fluid thereto under the action of a control valve 19. The valve 19 controls the flow of hydraulic fluid from an engine driven pump 20. Pump 20 is connected to the control valve by conduit 21.

In the example of FIG. 1 the valve 19 is located closely adjacent to the steering wheel 6. Thus the rotor of the control valve is directly connected to the attenuated steering column of the steering wheel 6. Additional power assistance can be provided by a further piston and cylinder unit indicated in dotted lines in the drawing at 25 along conduits 17', 18'.

In the example of FIG. 2 the control valve 19 is located closely adjacent to the slave pump motor adjacent the steerable wheels. Thus the rotor of the control valve 19 is directly connected to the shaft 8 connected to the rotor of the pump motor 7. The hydraulic fluid in the system can be made up from the reservoir 13 along conduit 24.

A duplicate control pump motor 9¹ and steering wheel 6¹ may be provided at any convenient location within the vehicle or on a boom extending therefrom.

FIG. 3 shows an arrangement in which the slave pump motor 7¹ has a very much larger capacity than, e.g., 25 times the capacity of, the control pump motor 9¹. The rotor of the slave pump motor 7¹ has a radial arm 26 connected to a conventional bell crank 27, the steering arm 28 of one steerable road wheel S and via a conventional track rod 29 to the steering arm 30 of the other steerable road wheel, wehreby the steerable wheels are directly turned by the slave pump motor 7¹.

The advantage of the present invention over other proposals for hydrostatic steering mechanism is that in the previous proposals there has only been one pump motor. This requires to be relatively large to provide the necessary power. Moreover it does not have the advantage provided by the present invention of the facility of providing a transmission ratio by the provision of two pump motors of different capacities.

What we claim is:

1. A power-assisted rack-and-pinion steering mechanism for a motor vehicle, the mechanism comprising a housing, a toothed rack movable longitudinally within said housing and adapted for connection to at least one steerable road wheel of a motor vehicle for imparting steering thereto, a pinion in meshing engagement with the toothed rack, the pinion being rotatable to impart longitudinal movement to the toothed rack, a steering control, a first positive displacement pump motor operatively connected to the steering control for actuation thereby, a second positive displacement pump motor operatively connected to said pinion for imparting rotational movement thereto, means connecting the output of each positive displacement pump motor with the input of the other and forming with said positive displacement pump motors a closed hydrostatic circuit, double-acting piston means operatively coupled with the toothed rack and slidable within a cylinder defined by said housing, and a control valve for directing fluid under pressure from a hydraulic circuit to one side or the other of the double-acting piston means for providing power-assistance, the control valve being operatively connected to one of said positive displacement pump motors for actuation thereby.

2. A steering arrangement according to claim 1, wherein the first positive displacement pump motor is of different capacity to the second positive displacement pump motor to provide a predetermined transmission ratio between the steering control and the at least one steerable road wheel.

3. A steering arrangement according to claim 1, wherein a fluid reservoir is connected with said hydrostatic circuit by way of a non-return valve.

4. A steering arrangement according to claim 1, wherein means is provided whereby air can be bled from said hydrostatic circuit.

5. A steering arrangement according to claim 1, comprising at least one further steering control, a further positive displacement pump motor being operatively connected with the or each said further steering control for actuation thereby and the or each such further positive displacement pump motor being connected in said closed hydrostatic circuit.

* * * * *